(12) United States Patent
Takokoro et al.

(10) Patent No.: US 6,965,927 B1
(45) Date of Patent: Nov. 15, 2005

(54) HARDWARE SETUP METHOD

(75) Inventors: Mizuho Takokoro, Yamato (JP); Kazuya Tsukizawa, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 528 days.

(21) Appl. No.: 09/510,569

(22) Filed: Feb. 22, 2000

(30) Foreign Application Priority Data

Mar. 3, 1999 (JP) ................................. 11-055104

(51) Int. Cl.[7] .......................................... G06F 15/177
(52) U.S. Cl. ........................... 709/220; 709/22; 713/1; 713/2
(58) Field of Search .................. 713/1, 2; 709/221, 709/222, 220; 703/24

(56) References Cited

U.S. PATENT DOCUMENTS

| | | | | |
|---|---|---|---|---|
| 5,913,058 A | * | 6/1999 | Bonola | 713/2 |
| 5,974,547 A | * | 10/1999 | Klimenko | 713/2 |
| 6,098,098 A | * | 8/2000 | Sandahl et al. | 709/221 |
| 6,324,644 B1 | * | 11/2001 | Rakavy et al. | 713/1 |

FOREIGN PATENT DOCUMENTS

| | | |
|---|---|---|
| JP | PUPA 09-218777 | 8/1997 |
| JP | PUPA 10-031590 | 2/1998 |
| JP | PUPA 10-091454 | 4/1998 |

* cited by examiner

*Primary Examiner*—David Wiley
*Assistant Examiner*—Michael Delgado
(74) *Attorney, Agent, or Firm*—Anthony N. Magistrale; Dillon & Yudell LLP (57) ABSTRACT

The current invention proposes a method, system, and data processing system program product to perform a hardware setup operation without installing a hardware setup program on the target data processing system. Stored in a server 12 are a hardware setup program 15 for performing the hardware setup of a data processing system 14 to be set up for hardware, dynamic link modules 16 for hardware setup used by the program 15 at the time of executing the hardware setup program, and a small program 17. The data processing system 14 accesses the server 12 through a network 11 to execute the small program 17 on the server 12. The program 17 transfers the dynamic link modules 16 for hardware setup to the data processing system 14, and thereafter it executes the hardware setup program 15 on the memory of the data processing system 14 while maintaining the program itself on the server 12.

6 Claims, 6 Drawing Sheets

HARDWARE SETUP METHOD

CROSS REFERENCE TO RELATED APPLICATION

This application claims priority from Japanese Patent Application 11-055104, filed Mar. 3, 1999, which is commonly assigned with the present application and is hereby incorporated by reference. The contents of the present application are not necessarily identical to the contents of the priority document.

BACKGROUND OF THE INVENTION

1. Technical Field

The present invention generally relates to providing an improved system of hardware setup in data processing systems and in particular to the ability to reduce the resources and effort required to accomplish such setup. Still more particularly, the present invention relates to the setup of hardware by means of a program operated over a data processing system network.

2. Description of the Related Art

The experience of repeatedly reconfiguring data processing system hardware absorbs the resources of organizations and the time of individuals for a seemingly limitless number of reasons. For instance, if a new peripheral device is added to a previously properly configured data processing system, it is often necessary to carry out a repetition of the hardware setup for pre-existing hardware so that the data processing system can recognize and drive the added device without conflict. The term "device" is a generic name for peripheral equipment (or peripheral devices) such as keyboards, mice, displays, and HDDs (Hard Disk Drives). Further, if the device drivers for an already installed device are upgraded, a hardware setup often needs to be performed to install the upgraded device driver into the data processing system. The device drivers are a program forming a part of the operating system (OS), which manages a device connected to the data processing system.

In the current state of the art, the hardware setup has been carried out in the following three ways.

(1) The data processing system has no hardware setup program of its own, and leaves the hardware setup entirely to the OS. In this case, for the Windows (trademark) OS, the hardware setup is carried out from the control panel.

(2) The data processing system has its own hardware setup program. In this case, the hardware setup program is executed after the hardware is installed into the data processing system.

(3) The hardware setup program of (2) described above also includes the function of (1) described above. As an example of a hardware setup program of this type, consider the ThinkPad Configuration Utility provided for the IBM ThinkPad™, a notebook-sized personal data processing system of International Business Machines Corporation of the U.S. and IBM Japan, Ltd. ThinkPad Configuration Utility is a so-called integrated program, in which all of the hardware setup items are collected into one place without regard to whether they exist on the OS. By simply executing this utility, any hardware setup operation that is available on the data processing system can be performed.

In case (1) above, the general-purpose nature of the OS precludes it from carrying out setup operations that for hardware that depends on the model of a data processing system. Accordingly, it must be used in combination with a hardware setup program of type (2). Case (3) above suffices to perform the necessary hardware setup operations because it integrates the functions of both the OS and the hardware setup program that is native to the data processing system.

At any rate, the hardware setup operation is carried out by executing the hardware setup program after installing it into the data processing system. There are various ways of installing the hardware setup program into the data processing system. For instance, if the hardware setup program is recorded on a portable recording medium such as a diskette (or floppy disk (FD)) or CD-ROM, the portable recording medium is set in a special drive and the hardware setup program is installed. Further, if the hardware setup program is stored on a server data processing system on a network, the data processing system undergoing the hardware setup operation is connected to the network, and the installation is performed by downloading the hardware setup program from the server data processing system.

The installation of the hardware setup program requires substantial effort. The required effort becomes increasingly significant in companies that have installed a large number of data processing systems of the same model. In the large number of data processing systems of the same model owned by companies, hardware settings often need to be uniform across all systems. In the current state of the art, to perform the hardware setup, the hardware setup program has to be installed for each individual data processing system. Moreover, if the hardware setup program is upgraded, it must be reinstalled on each system. If there are many data processing systems to be set up, the reinstallation requires a great effort.

The conventional hardware setup method is based on the premise that the hardware setup program must be installed into a data processing system. This creates a problem in that the installation requires a great effort if the hardware setup operation is to be performed on many machines.

It would be desirable, therefore, to be able to perform the hardware setup operation without installing the hardware setup program on the machine on which the hardware setup operation is to be performed. It would further be advantageous if the hardware setup operation could be performed from a server residing on a data processing system network.

SUMMARY OF THE INVENTION

It is the object of the present invention to provide a hardware setup method that enables a hardware setup operation to be performed in a data processing system without installing a hardware setup program.

The hardware setup method related to the present invention is configured as follows. First, a server data processing system connected to a network prepares a hardware setup program for performing a hardware setup operation, dynamic link modules for hardware setup operation to be used by the hardware setup program at the time of execution of the hardware setup program, and a small program for executing the hardware setup program. Then, a data processing system undergoing the hardware setup operation accesses the server data processing system. The data processing system undergoing the hardware setup executes the small program on the server data processing system. The executed small program transfers the dynamic link modules for the hardware setup operation to the data processing system undergoing the hardware setup. The small program then executes the hardware setup program on the memory of the data processing system undergoing the hardware setup operation, while maintaining the program itself on the server data processing system.

As described above, in the hardware setup method related to the present invention, the hardware setup program is executed on the memory of the data processing system undergoing a hardware setup operation but maintained on the server data processing system on the network to which the data processing system undergoing the hardware setup operation is connected. Accordingly, the hardware setup program need not be installed into the data processing system undergoing the hardware setup. Thus, in the present invention, the hardware setup operation can be performed without installing the hardware setup program into the data processing system undergoing the hardware setup operation. This can solve the problem of the background art.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
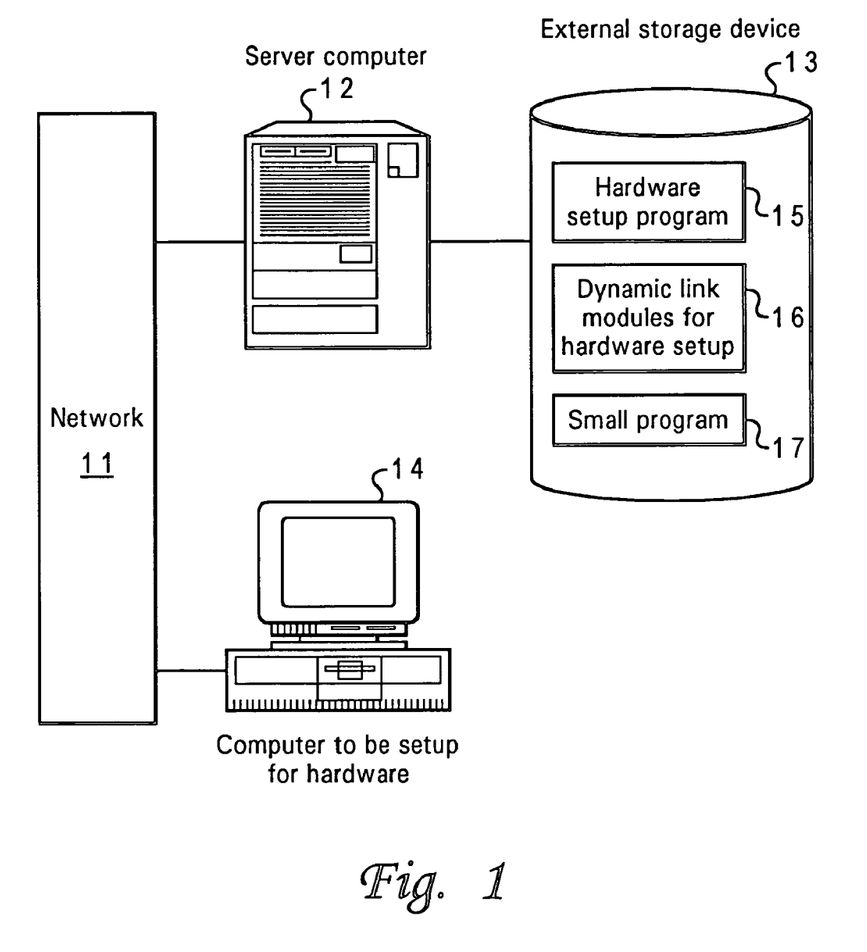
FIG. 1 depicts the data processing systems and networks involved in the hardware setup method related to an embodiment of the present invention.

With reference now to the figures, and in particular with reference to FIG. 1, the preferred embodiment will function in the environment of a computer network as portrayed in FIG. 1, a diagram showing the hardware setup method related to an embodiment of the present invention. Connected to a network 11 are a server data processing system 12, and a data processing system 14 undergoing the hardware setup operation, hereafter the "client". The server data processing system 12 includes an external storage device 13 such as a hard disk drive. In the external storage device 13, a hardware setup program 15, dynamic link modules 16 for hardware setup operations, and a small program 17 are stored.

The hardware setup program 15 is a program for setting up the hardware of the client data processing system 14. The dynamic link modules 16 for hardware setup include functions and subroutines that are invoked and used by the hardware setup program 15, and program modules such as device drivers. The small program 17 is a program executed by the data processing system 14 to perform the hardware setup. The hardware setup method related to the embodiment will be described below with reference to FIG. 1.

First, the data processing system 14 to perform the hardware setup accesses the server data processing system 12 through the network 11. Then, it executes, on the server data processing system 12, the small program 17 stored in the server data processing system 12. The client data processing system 17 accepts the dynamic link modules for hardware setup from the server data processing system 12. Then the small program 17 executes the hardware setup program 15 on the server data processing system 12. The executed hardware setup program 15 uses the transferred dynamic link modules 16 for hardware setup to perform the hardware setup operation on the client data processing system 14. This completes the hardware setup of the data processing system 14.

In accordance with this embodiment, the execution of the hardware setup program 15 is carried out on the server data processing system 12, and thus, after the execution, the hardware setup program does not remain on the client data processing system 14. This can solve the various problems with the prior art.

In the above described embodiment, an example using the dynamic link modules 16 for hardware setup has been shown. The contents of the dynamic link modules 16 for hardware setup depend on the instructions of the hardware setup program 15. The hardware setup program 15 is made up mainly of programs in an execution form, which have an extension "EXE." The hardware setup program 15 includes libraries having an extension "DLL," and device drivers having extensions "VXD" and "SYS." The hardware setup program 15 calls these libraries and device drivers at the time of execution of the hardware setup program. The libraries contain functions or subroutines called and used by the program in executing the hardware setup program. The device drivers are a programs, which provide communication between the data processing system and peripheral devices. The allow the data processing system to drive the hardware of the peripheral device.

However, the above libraries also include those that are not related to the hardware setup (for instance, the one related to screen display). These libraries that are not related to the hardware setup are not included in the dynamic link modules 16 for hardware setup. Further, the hardware setup program 15 may be constructed to use only device drivers as the dynamic link modules 16.

Figure 2:
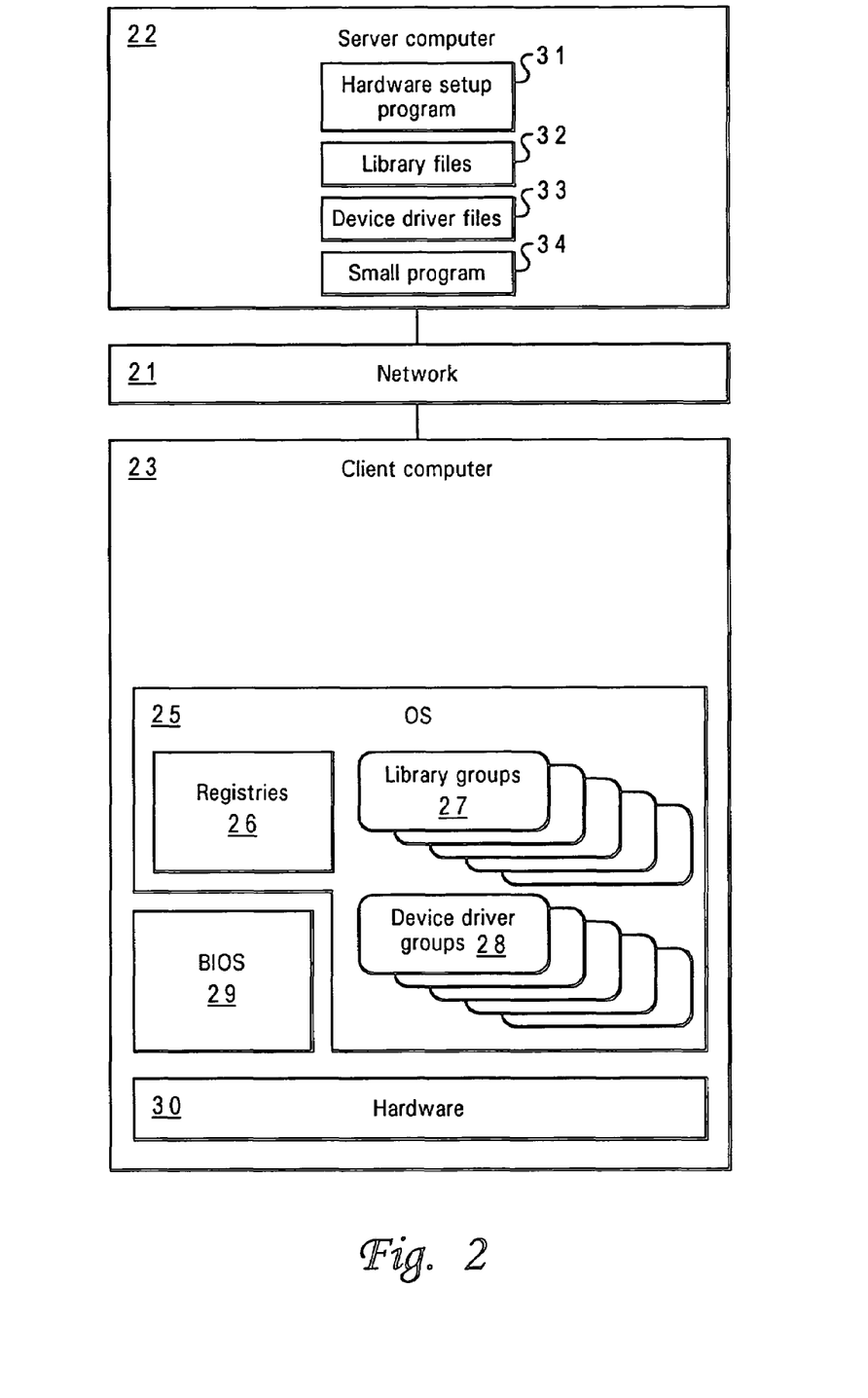
FIG. 2 illustrates the disposition of software components and data structures related to the hardware setup method of a further embodiment of the present invention (No. 1)
Figure 3:
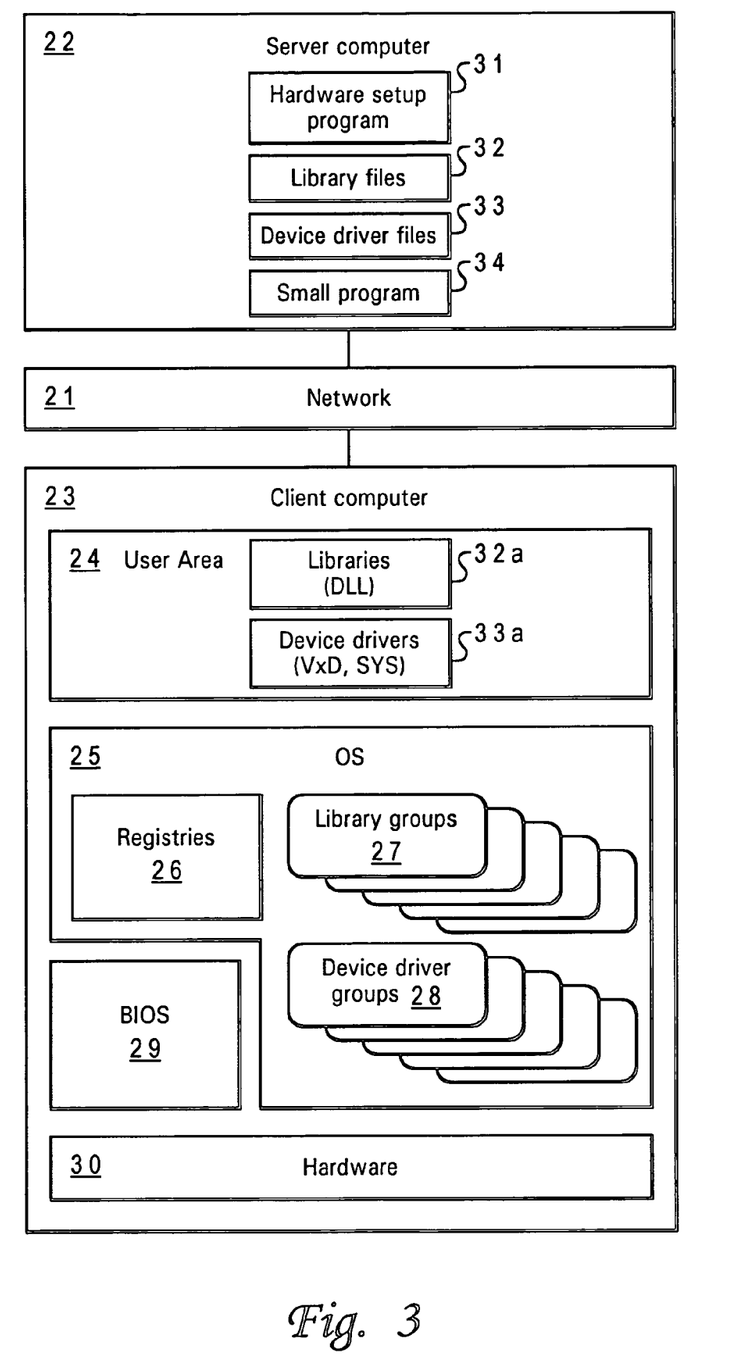
FIG. 3 further depicts the disposition of software components and data structures related to the hardware setup method of a further embodiment of the present invention (No. 2) at a later stage of the operation.

A further embodiment related to the present invention will be described below, covering the case in which the hardware setup program has both libraries and device drivers as the dynamic link modules for hardware setup. FIGS. 2 and 3 explain the hardware setup method related to this embodiment. Connected to a network 21 are a server data processing system 22 and a client data processing system 23. The term "client data processing system 23" is used herein. However, the client data processing system 23 in FIGS. 2 and 3 is not necessarily an element of a client server system. The client data processing system 23 is substantially the same as the "data processing system 14 to perform hardware setup" shown in FIG. 1.

The client data processing system 23 includes a user area 24, OS (operating system) 25, BIOS 29, and hardware 30. The network 21 can take various forms, for instance, LAN (Local Area Network), WAN (Wide Area Network), and Internet. The server data processing system 22 can take various forms, for instance, the server machine in a client server system (C/S system), and a Web site in the Internet (also known as WWW (World Wide Web) server).

The client data processing system 23 can take various forms, for instance, a client machine in a client server system (C/S system), and various data processing systems connected to the Internet. The user area 24 is an area in which application programs and data are developed. The application program is a generic name of data processing system programs used by the user for a certain application. It is also simply called an "application." In this embodiment, only the execution method of a hardware setup program 31 is discussed. For a length of time after the beginning, no change is seen in the status of the client data processing system 23, so the user area 24 is not shown in FIG. 2.

The OS (operating system) 25 is basic software that manages programs, data, and hardware to efficiently process the task given to the client data processing system 23. Although FIG. 2 shows only registries 26, library groups 27, and device driver groups 28 as the structural elements of the OS 25, the OS 25 includes various programs in addition to those.

The registries 26 are files in which the setup information of device drivers and applications is recorded. If a hardware setting is changed, the hardware setup data in the registries 26 is also changed. The library groups 27 are a collection of functions and subroutines invoked and used by programs.

The device driver groups 28 are a collection of programs forming a part of the OS 25, which manages each peripheral equipment device, (or hardware 30) connected to the client data processing system 23. The BIOS (Basic Input/Output System) 29 is positioned between the OS 25 and the hardware 30, and it starts up the system and provides the functions such as Plug and Play (PnP) and power management. The BIOS was originally a program for controlling the input/output performed by the OS between pieces of the hardware (namely, a basic input/output system as represented by its name). However, the BIOS was developed for single-task OSs, and as the multitasking OS such as Windows 95™, Windows 98™, and OS/2™ has entered widespread use, emphasis has been put on the functions such as PnP and power management, replacing the original role of the basic input/output system. The device driver groups 28 control the input/output between the OS 25 and the hardware 30.

Now, with reference to FIGS. 2 and 3, the hardware setup method related to this embodiment will be described. The hardware setup program 31, library files 32, device driver files 33, and small program 34 are provided in the server data processing system 22. Specifically, they are stored in the hard disk drive included in the server data processing system 22. The hardware setup program 31 is a program for setting up the hardware of the client data processing system 23. The library files 32 are files in which a plurality of libraries are stored. The libraries are a function or subroutine invoked and used by the hardware setup program 31 at the time of execution of the hardware setup program.

The device driver files 33 are files in which device drivers are stored. Device drivers are programs forming a part of the OS, which manages a device connected to the client data processing system 23. The small programs 34 are programs that the client data processing system 23 executes on the server data processing system 22. The hardware setup method related to this embodiment will be described below with reference to the flowchart shown in FIG. 4.

Figure 4:
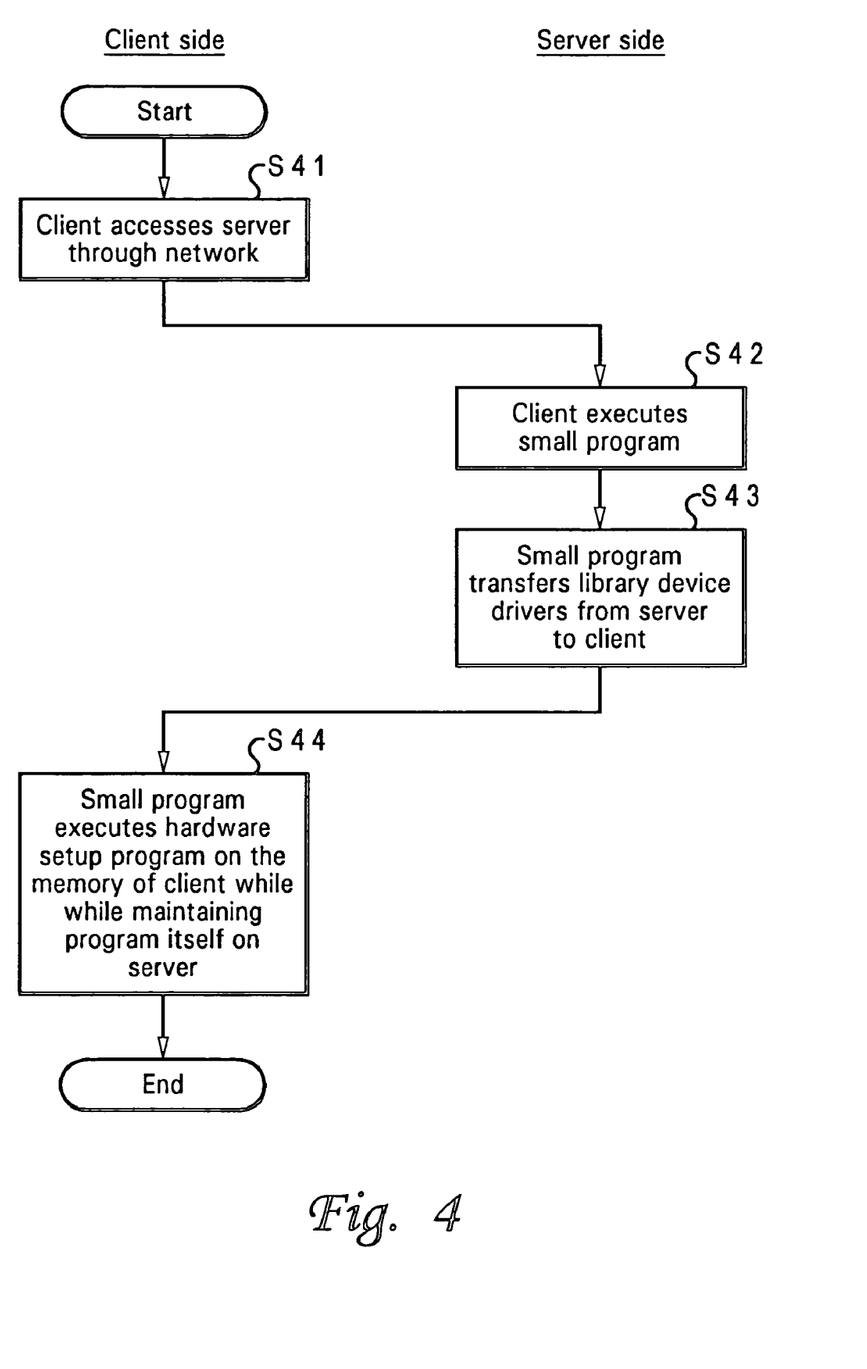
FIG. 4 illustrates, through a flowchart, the operation of the hardware setup method related to a further embodiment of the present invention (No. 1)

First, the client data processing system 23 connects to the network 21 to access the server data processing system 22 (step S41). Then, the client data processing system 23 executes the small program 34 on the server data processing system 22 (step S42). The small programs 34 transfers libraries 32a and device drivers 33a necessary for the hardware setup of the client data processing system 23 to the client data processing system 23 from the library files 32 and the device driver files 33 of the server data processing system 22 (step S43). The state of the client data processing system 23 in this condition is shown in FIG. 3. The client data processing system 23 stores the transferred libraries 32a and device drivers 33a in the user area 24. The small programs 34 executes the hardware setup program 31 on the memory of the client data processing system 23, while storing the program itself on the server data processing system 22 (step S44).

Figure 5:
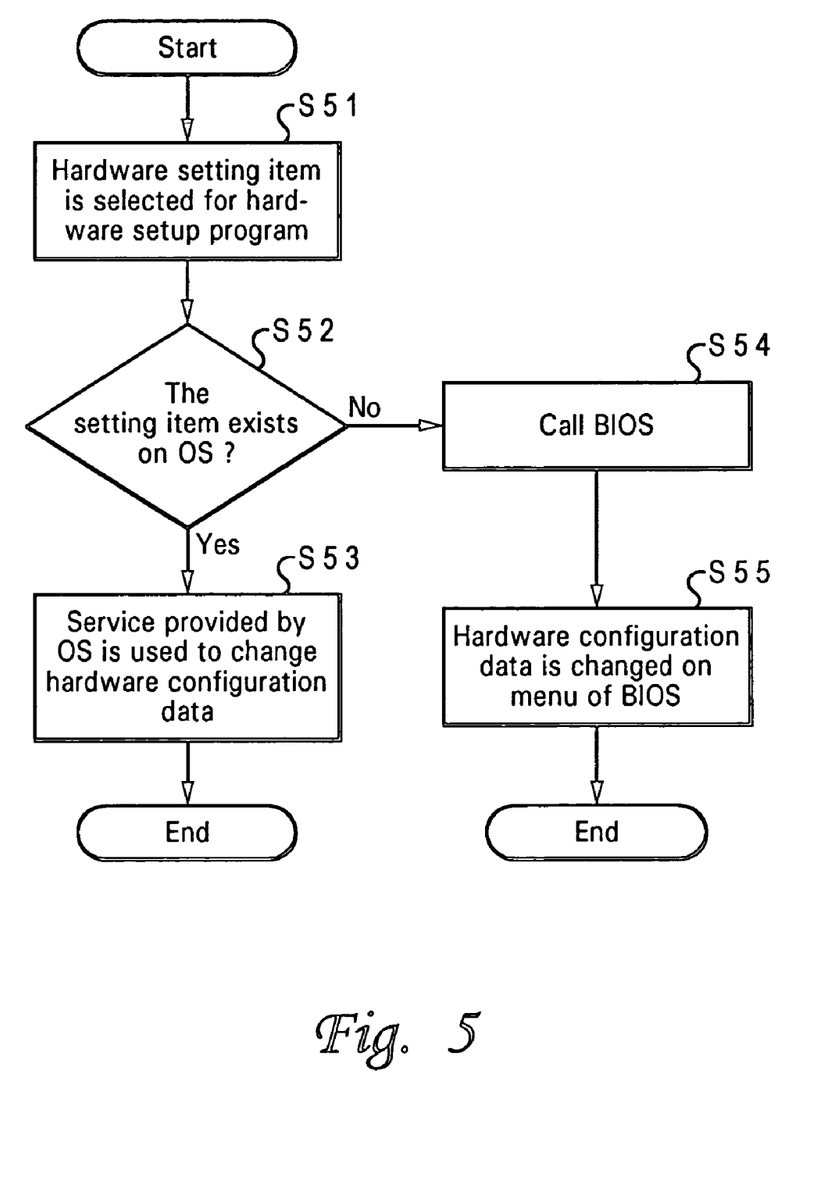
FIG. 5 is a flowchart showing the operation of the hardware setup method related to a further embodiment of the present invention (No. 2)

Now, the operation of the hardware setup program 31 is described with reference to the flowchart shown in FIG. 5. First, the user of the client data processing system 23 selects a hardware setting item required to be set up. That is, a hardware setting item is selected for the hardware setup program 31 (step S51). Then, the hardware setup program 31 determines whether or not the selected hardware setting item exists on the OS 25 (step S52). If the answer is yes, the process goes to step S53, otherwise to step S54.

In step S53, the hardware setup program 31 uses a service provided by the OS 25 to change the hardware configuration data. In this case, the hardware setup program 31 terminates the execution at this point, and transfers control to the OS 25 of the client data processing system 23.

In step S54, the hardware setup program 31 calls the BIOS 29. And, it changes the hardware configuration data on the menu of the BIOS (step S55). In this case, the hardware setup program 31 terminates the execution at this point, and transfers control to the OS 25 of the client data processing system 23. The OS 25 having received control from step S53 has the changed hardware configuration data, because the hardware configuration data was changed by the service itself. The OS 25 uses the changed hardware configuration data to modify the contents of the registries 26.

Figure 6:
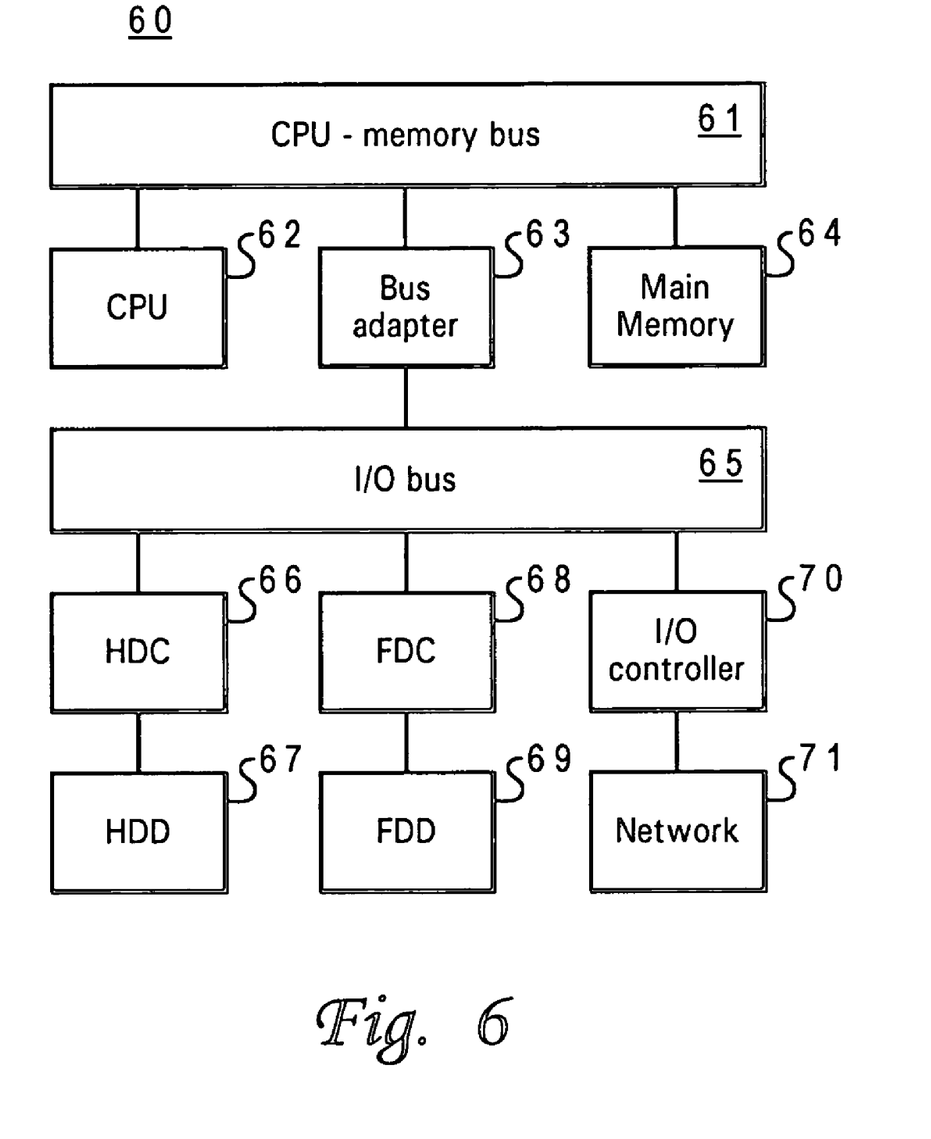
FIG. 6 depicts an example of the server data processing system used in the preferred embodiments of the present invention.

The OS 25 having received control from step S55 gets the changed hardware configuration data from the BIOS 29. The OS 25 uses the changed hardware configuration data to modify the contents of the registries 26. Now, an example of the server data processing system used in this embodiment is described with reference to FIG. 6. The server data processing system 60 is constructed as follows. To a high-speed CPU-memory bus 61, a CPU (Central Processing Unit) 62, and a main memory 64 are connected. To the CPU-memory bus 61, an I/O (Input/Output) bus 65 of a relatively slow speed is connected via a bus adapter 63. Respectively connected to the I/O bus 65 are a hard disk drive (HDD) 67 via a hard disk controller (HDC) 66, a floppy disk drive (FDD) 69 via a floppy disk controller (FDC) 68, and a network 71 via an I/O controller 70. In FIG. 6, only the main parts are shown. The server data processing system is made up of many parts other than those parts listed.

As the CPU 62, microprocessors from Intel Corporation of the U.S., International Business Machines Corporation of the U.S., Sun Microsystems Inc. of the U.S., and the like can be used. The main memory 64 is constructed using a DRAM (Dynamic Random Access Memory). The type and memory capacity of the DRAM depend on the use of the server data processing system 60.

Since the CPU-memory bus 61 for connecting the CPU 62 and the main memory 64 depends on the architecture of the CPU 62, the one originally designed by the maker of the server data processing system 60 is used. As the I/O bus 65, for instance, a PCI bus can be used. PCI (Peripheral Component Interconnect) bus is a bus standard prescribed by the PCI Special Interest Group: a group for standardization in which several hundreds of companies including IBM of the U.S. and Compaq Computer Corporation of the U.S. are taking part, with Intel Corporation being the core of it).

As the hard disk drive (HDD) 67, one having a large capacity is used so that it can take responsibility as the server data processing system. In addition to a stand-alone disk drive, a disk array (for example, RAID: Redundant Array of Inexpensive Disks), in which a plurality of disk devices is arranged in an array, can be used.

The network 71 may be any of various ones such as LAN (Local Area Network), WAN (Wide Area Network), and Internet, depending on the use status of the server data processing system. The hardware setup program 31, library files 32, device driver files 33, and small program 34, shown in FIG. 2, are mounted on the hard disk drive (HDD) 67.

The preferred embodiments of the hardware setup program related to the present invention have been described above. The implementation of the hardware setup method related to the present invention requires only the connection of the data processing system to be set up for hardware to the network. The network is not limited to a special one. It may be any of various ones, for instance, LAN (Local Area Network), WAN (Wide Area Network), and Internet.

In accordance with the embodiments, the following advantages can be obtained. Since the hardware setup program is executed on the server data processing system, the hardware setup can be provided without installing the hardware setup program into the data processing system that is being configured.

The hardware setup of a plurality of data processing systems can be carried out without installing the hardware setup program itself on the machines undergoing the setup operation. This gives great benefit to companies which have installed a large number of data processing systems of the same model. In the data processing systems owned by such companies, the same hardware setting needs to be imposed as a repeated standard. Conventionally, to perform the hardware setup, the hardware setup program has been installed for each individual data processing system. However, if the hardware setup program is upgraded, it must be reinstalled. If there are many data processing systems to be set up, the reinstallation requires much effort. In the embodiments, such effort can be reduced.

The server data processing system can prepare hardware setup programs corresponding to various models of machines or operating systems. Accordingly, the data processing system to be set up for hardware can realize the hardware setup without becoming conscious of the model or the operating system used. The server data processing system can always prepare the newest hardware setup program. In the embodiments, even if the hardware setup program is executed once, the hardware setup program itself does not remain in the data processing system on the user side. Accordingly, the data processing system on the user side can always use the newest hardware setup program. With this, the user need not check the version of the hardware setup program. This results in reduction in the number of times the user makes inquiries to the help center.

Since it is not necessary to preload (preinstall) the hardware setup program in the data processing system, it is not necessary to prepare a temporary version of hardware setup program when announcing the release of a new product. As a result, a longer period of time can be taken for developing a hardware setup program, so a hardware setup program which is inexpensive, though of high-quality, can be provided.

The above described hardware setup methods according to the embodiments of the present invention can be made into a program (hereinafter referred to as "hardware setup execution program") using various programming languages. The hardware setup execution program is recorded on a machine-readable recording medium. As the recording medium, portable recording media such as ROM (Read Only Memory), EEPROM (Electrically Erasable Programmable Read Only Memory), and flash EEPROM for a memory device, floppy disk (FD), CD-ROM (read only memory using compact disc), and MO (Magneto-Optic) disc which are mounted on a data processing system system, or the external storage device provided in a server data processing system connected to a network can be used.

The hardware setup execution program recorded on a recording medium is taken into the server data processing system 60 as follows. If the recording medium having recorded thereon the hardware setup execution program related to the embodiment is a floppy disk (FD), the FD is loaded into the FDD 69, and the hardware setup execution program recorded on the FD is read in. And, the hardware setup execution program is written to the hard disk (HDD) 67. This also applies to the case in which the recording medium having recorded thereon the hardware setup execution program is another portable recording medium such as a CD-ROM or MO disc. If the recording medium is an external storage device on a network, the hardware setup execution program related to the embodiment, recorded on the external storage device, is downloaded through a network 71. And, the downloaded hardware setup execution program is stored in the hard disk (HDD) 67.

It is important to note that while the present invention has been described in the context of a fully functional data processing system and/or network, those skilled in the art will appreciate that the mechanism of the present invention is capable of being distributed in the form of a computer usable medium of instructions in a variety of forms, and that the present invention applies equally regardless of the particular type of signal bearing medium used to actually carry out the distribution. Examples of computer usable mediums include: nonvolatile, hard-coded type mediums such as read only memories (ROMs) or erasable, electrically programmable read only memories (EEPROMs), recordable type mediums such as floppy disks, hard disk drives and CD-ROMs, and transmission type mediums such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method for performing a hardware setup operation on a data processing system, said method comprising:

storing a hardware setup program and a plurality of dynamic link modules in a server data processing system;

coupling a data processing system to said server data processing system via a data processing system network;

in response to a request to execute said hardware setup program by said data processing system, executing said hardware setup program within said server data processing system, wherein said hardware setup program performs a hardware setup operation required by said data processing system by using a service provided by an operating system when said hardware setup operation exists within said operating system running on said data processing system, wherein said hardware setup program calls a BIOS program within said data processing system to perform said hardware setup operation when said hardware setup operation does not exist within said operating system running on said data processing system; and modifying hardware configuration data within said data processing system according to instructions generated from said execution of said hardware setup program within said server data processing system.

2. The method of claim 1, wherein said method further includes transferring one or more of said dynamic link modules from said server data processing system to said data processing system via said data processing system network as a result of said execution of said hardware setup program.

3. An apparatus for performing a hardware setup operation on a data processing system, said apparatus comprising:

means for storing a hardware setup program and a plurality of dynamic link modules in a server data processing system;

means for coupling a data processing system to said server data processing system via a data processing system network;

means for executing said hardware setup program within said server data processing system, in response to a request to execute said hardware setup program by said data processing system, wherein said hardware setup program performs a hardware setup operation required by said data processing system by using a service provided by an operating system when said hardware setup operation exists within said operating system running on said data processing system, wherein said hardware setup program calls a BIOS program within said data processing system to perform said hardware setup operation when said hardware setup operation does not exist within said operating system running said data processing system; and means for modifying hardware configuration data within said data processing system according to instructions generated from said execution of said hardware setup program within said server data processing system.

4. The apparatus of claim 3, wherein said apparatus further includes means for transferring one or more of said dynamic link modules from said server data processing system to said data processing system via said data processing system network as a result of said execution of said hardware setup program.

5. A computer program product for performing a hardware setup operation on a data processing system, said computer program product comprising:

program code means for storing a hardware setup program and a plurality of dynamic link modules in a server data processing system;

program code mean for coupling a data processing system to said server data processing system via a data processing system network;

program code means for executing said hardware setup program within said server data processing system, in response to a request to execute said hardware setup program by said data processing system, where in hardware setup program performs a hardware setup operation required by said data processing system by using a service provided by an operating system when said hardware setup operation exists within said operating system running on said data processing system, wherein said hardware setup program calls a BIOS program within said data processing system to perform said hardware setup operation when said hardware setup operation does not exist within said operating system running on said data processing system; and program code means for modifying hardware configuration data within said data processing system according to instructions generated from said execution of said hardware setup program within said server data processing system.

6. The computer program product of claim 5, wherein said computer program product further includes program code means for transferring one or more of said dynamic link modules from said server data processing system to said data processing system via said data processing system network as a result of said execution of said hardware setup program.

* * * * *